United States Patent
Shukuin et al.

(10) Patent No.: US 9,565,352 B2
(45) Date of Patent: Feb. 7, 2017

(54) OPTICAL APPARATUS

(71) Applicant: CANON KABUSHIKI KAISHA, Tokyo (JP)

(72) Inventors: Hirokazu Shukuin, Shioya-gun (JP); Kunihiko Sasaki, Utsunomiya (JP); Yuki Nagao, Utsonomiya (JP); Daisuke Ochi, Utsunomiya (JP); Atsushi Koyama, Utsunomiya (JP); Shigehiro Torii, Utsunomiya (JP); Shota Shimada, Tokyo (JP); Masayasu Mizushima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 13/756,648

(22) Filed: Feb. 1, 2013

(65) Prior Publication Data

US 2013/0201385 A1 Aug. 8, 2013

(30) Foreign Application Priority Data

Feb. 2, 2012 (JP) .................................. 2012-020662

(51) Int. Cl.
*H04N 5/232* (2006.01)
*H04N 5/225* (2006.01)
*G03B 13/00* (2006.01)

(52) U.S. Cl.
CPC ................................ *H04N 5/23212* (2013.01)

(58) Field of Classification Search
CPC ....... G02B 15/173; G02B 7/102; G02B 15/17; G02B 13/36; H04N 5/23212; H04N 5/23209; H04N 5/23296; H04N 5/2254; H04N 5/23245

(Continued)

(56) References Cited

U.S. PATENT DOCUMENTS

2005/0276590 A1* 12/2005 Ishikawa et al. ............... 396/55
2008/0107355 A1* 5/2008 Onuki .......................... 382/284

(Continued)

FOREIGN PATENT DOCUMENTS

JP 2003029135 A 1/2003
JP 2009-003122 A 1/2009

(Continued)

OTHER PUBLICATIONS

Japanese Office Action issued in Japanese counterpart application No. JP2012-020662, dated Sep. 24, 2015.

*Primary Examiner* — Twyler Haskins
*Assistant Examiner* — Carramah J Quiett
(74) *Attorney, Agent, or Firm* — Rossi, Kimms & McDowell LLP

(57) ABSTRACT

An optical apparatus includes an image sensor that includes a focus detecting pixel and an image pickup pixel, a first focus detector configured to provide a focus detection based upon a phase difference between the pair of image signals detected by the focus detecting pixel of the image sensor, a second focus detector configured to provide a focus detection based upon a contrast value based upon an output of the image pickup pixel of the image sensor, and a controller configured to provide autofocus utilizing the first focus detector when a focus detection precision of the first focus detector is equal to or higher than a first value and an image magnification variation amount calculated from a wobbling amount of the image pickup optical system used for the second focus detector is equal to or higher than a second value.

8 Claims, 2 Drawing Sheets

(58) Field of Classification Search
USPC ......... 348/340, 345, 347, 350, 240.99–240.2
See application file for complete search history.

(56) References Cited

U.S. PATENT DOCUMENTS

| | | | |
|---|---|---|---|
| 2008/0317454 A1* | 12/2008 | Onuki .......................... | 396/128 |
| 2009/0175611 A1* | 7/2009 | Kiyamura et al. ............ | 396/133 |
| 2010/0150538 A1* | 6/2010 | Ono et al. ..................... | 396/104 |
| 2010/0238321 A1* | 9/2010 | Honjo et al. ............. | 348/231.99 |
| 2010/0309365 A1* | 12/2010 | Inoue .......................... | 348/345 |
| 2013/0113983 A1* | 5/2013 | Yumiki ................. | G02B 7/102 |
| | | | 348/345 |

FOREIGN PATENT DOCUMENTS

| | | |
|---|---|---|
| JP | 2010-139942 A | 6/2010 |
| JP | 2010-282085 A | 12/2010 |
| JP | 2010281846 A | 12/2010 |

\* cited by examiner

OPTICAL APPARATUS

BACKGROUND OF THE INVENTION

Field of the Invention

The present invention relates to an optical apparatus.

Description of the Related Art

Japanese Patent Laid-Open No. ("JP") 2009-3122 discloses an image pickup apparatus that provides phase difference detecting pixels in part of an image sensor and realizes autofocus ("AF") of a phase difference detecting method (so-called "image-pickup-plane phase-difference AF") utilizing them. JP 2010-282085 discloses an image pickup apparatus that uses two focus detecting methods, such as the image-pickup-plane phase-difference AF and a contrast AF (referred to as a "TV-AF" hereinafter). JP 2010-139942 proposes a method for calculating the focus detecting precision of the image-pickup-plane phase-difference AF.

In general, the in-focus precision of the phase difference AF is lower than that of the TV-AF, and the method of JP 2009-3122 is likely to have a lower in-focus precision. According to the method of JP 2010-282085, as a wobbling amount of the focus lens increases, for example, when an F-number is large, an image magnification variation of the live view capturing or an image taken in the motion image capturing can be remarkable and the image quality deteriorates. For example, when an interchangeable lens configured to provide the TV-AF is attached to a camera body configured to provide the image-pickup-plane phase-difference AF, a selection of one of the AF methods becomes an issue.

SUMMARY OF THE INVENTION

The present invention provides an optical apparatus that can properly select a focus detecting method among the image-pickup-plane phase-difference AF and the TV-AF.

An optical apparatus according to the present invention includes an image sensor that includes a focus detecting pixel configured to detect a pair of image signals, and an image pickup pixel configured to photoelectrically convert an optical image formed by an image pickup optical system, a first focus detector configured to provide a focus detection based upon a phase difference between the pair of image signals detected by the focus detecting pixel of the image sensor, a second focus detector configured to provide a focus detection based upon a contrast value based upon an output of the image pickup pixel of the image sensor, and a controller configured to provide autofocus utilizing the first focus detector when a focus detection precision of the first focus detector is equal to or higher than a first value and an image magnification variation amount calculated from a wobbling amount of the image pickup optical system used for the second focus detector is equal to or higher than a second value.

Further features of the present invention will become apparent from the following description of exemplary embodiments with reference to the attached drawings.

DESCRIPTION OF THE EMBODIMENTS

Figure 1:
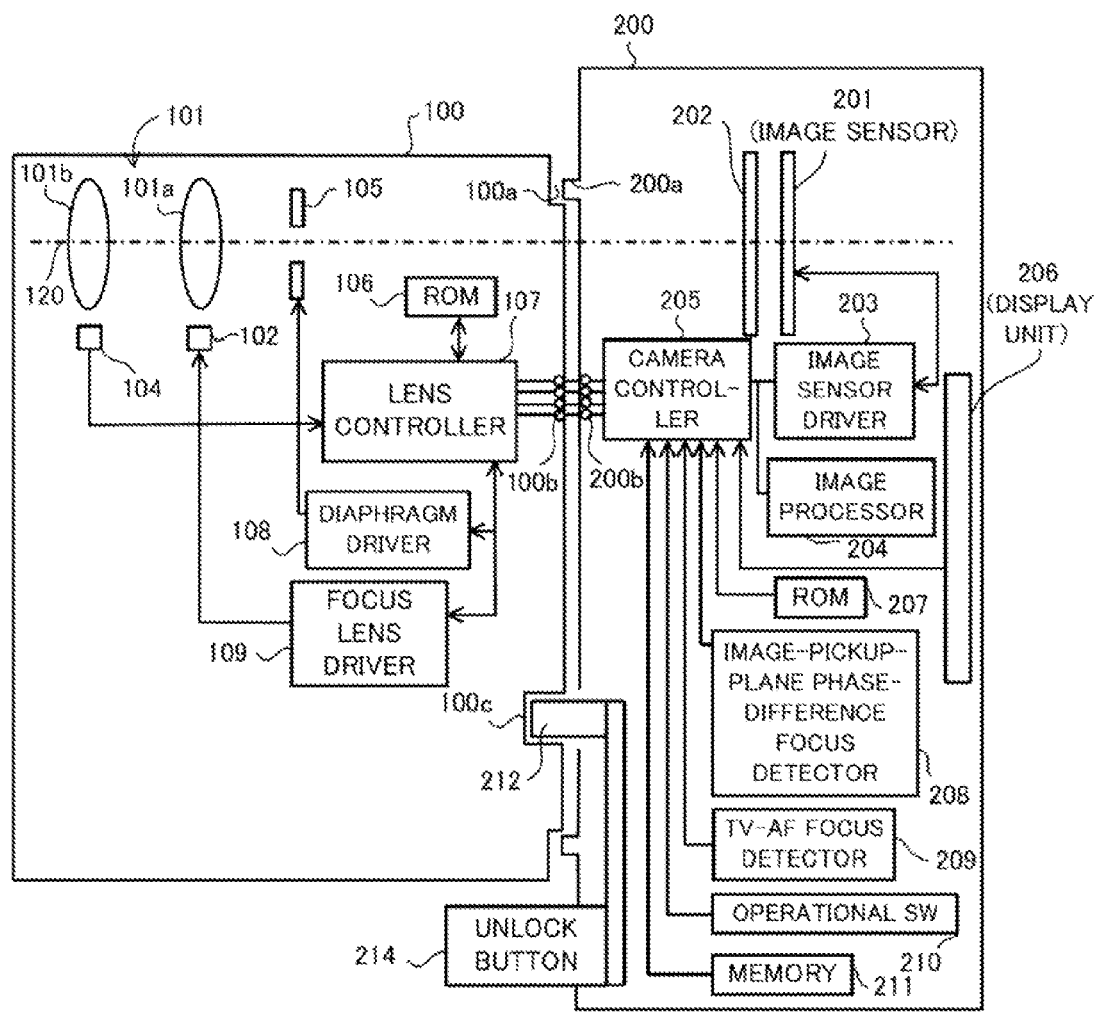
FIG. 1 is a block diagram of a camera system according to this embodiment.

FIG. 1 is a camera system (optical apparatus) as an image pickup system according to this embodiment. The camera system includes an interchangeable lens 100, and a camera body 200 as an image pickup apparatus (optical apparatus) to which the interchangeable lens 100 is detachably attached.

100a and 200a are a lens mount and a camera mount which enable the interchangeable lens 100 and the camera body 200 to be mechanically engaged with each other. The lens mount 100a has a lens mount concave 100c, into which a lock pin 212 is inserted from the camera body 200 so as to restrict a detachment between the interchangeable lens 100 and the camera body 200. When the unlock button 214 is pressed, the lock pin 212 associatively escapes from the interchangeable lens 100 and the interchangeable lens 100 becomes detachable. 100b and 200b are contacts that enable electric communications between the interchangeable lens 100 and the camera body 200.

The interchangeable lens 100 includes an image pickup optical system 101 that includes a plurality of optical lens units and forms an optical image of an object. The image pickup optical system 101 includes a focus lens unit (simply referred to as a "focus lens" hereinafter) 101a and a zoom lens unit (simply referred to as a "zoom lens" hereinafter) 101b. The focus lens 101a moves in a direction of an optical axis 120 for focusing, and is configured to wobble (micro move). The zoom lens 101b moves in the direction of the optical axis 120, and is configured to change a focal length.

In the autofocus ("AF"), the focus lens 101a is moved to a plurality of positions in the optical axis direction by a driving force from the AF actuator 102. The AF actuator 102 serves as a position detector configured to detect a current position of the focus lens 101a. An in-focus position is determined based upon a contrast evaluation value of an object image at each focus lens position, and the focus lens 101a is moved to the in-focus position.

More specifically, a control signal from a camera controller 205 is sent to an interchangeable lens controller 107 via the contacts 100b and 200b. The interchangeable controller 107 includes a microcomputer or a CPU, and serves as a controller configured to control an operation of the interchangeable lens 100. Thereafter, a driving signal is sent to the focus lens driver 109 in accordance with the control signal from the interchangeable lens controller 107.

A focus lens driver 109 drives an AF actuator 102 based upon a driving signal and focus lens position information stored in the ROM 106. As a result, the focus lens 101a is moved in the optical axis direction. A pulsed plate (not illustrated) is attached to the AF actuator 102 and rotated in synchronization with the AF actuator 102. As the AF actuator 102 is driven, the pulsed plate of the AF actuator 102 is rotated, and a change of a slit provided in the pulsed plate is detected by a photo-interrupter (not illustrated).

A detection signal of the photo-interrupter is sent to the interchangeable controller 107. The positional information of the focus lens 101a is obtained based upon the focus lens position information stored in the ROM 106 and the detection signal of the photo-interrupter.

The focus lens position information is sent to the camera controller 205 from the interchangeable controller 107 via the contacts 200b and 100b. The image sensor 201 of the camera body 200 takes an object image, and the camera controller 205 calculates an evaluation value (contrast value) of the object image.

Thus, the camera controller 205 obtains information at a plurality of focus lens positions, and an evaluation value of the object image at each focus lens position. The camera controller 205 moves the focus lens 101a to an in-focus position that maximizes the evaluation value based upon these two types of information (TV-AF).

In order to determine an (in-focus) direction from the current position in which an in-focus position is located, the focus lens 101a is wobbled on the optical axis, and the direction in which the contrast value increases is determined to be an in-focus direction.

The camera controller 205 prepares information of a plurality of wobbling amounts for each of a zoom position state (focal length), a focus position state (object distance), and a diaphragm state. The focus lens 101a is wobbled utilizing a value of a wobbling amount suitable for each state.

The wobbling amount depends upon the depth of field (in-focus width). It is therefore necessary to set a larger wobbling amount (a defocus operation) of the focus lens 101a on the wide angle side of the zoom position than the telephoto side, on the long distance side of the object distance than the short distance side, and in the small (diffracting) diaphragm state of the diaphragm than the open state. The wobbling enables the in-focus direction to be determined on the imaging plane of the image sensor 201.

In changing a focal length, a zoom ring (not illustrated) provided on an outer circumference surface of the interchangeable lens 100 is rotated, and the zoom lens 101b is moved in the optical axis direction. When the zoom ring is rotated, a detector of a linear position sensor 104 configured to detect the zoom position along the cam groove provided in the inner circumference of the zoom ring moves back and forth in the direction of the optical axis 120 and the zoom position is detected. The detected zoom position is sent to the interchangeable lens controller 107, and then to the camera controller 205 via the contacts 200b and 100b. As a result, the camera controller 205 can obtain focal length information. When the focal length is changed, a position of the focus lens 101a is automatically changed based upon information recorded in the ROM 106 so as to maintain a focus on the same object distance. The ROM 106 may be installed in the interchangeable lens controller 107.

A light quantity is controlled by driving the diaphragm 105. The diaphragm 105 includes a plurality of diaphragm blades. When the control signal from the camera controller 205 is sent to the interchangeable lens controller 107 via the contacts 100b and 200b, the interchangeable lens controller 107 sends a driving signal to a diaphragm driver 108. In response to the driving signal, the diaphragm driver 108 operates the diaphragm actuator (not illustrated) and drives the diaphragm blades. Thereby, the opening area (diaphragm aperture diameter) as a light entrance is changed and the light quantity is controlled.

The camera body 200 includes an image sensor 201, an optical low-pass filter 202, and a driving/control system. The camera body 200 of this embodiment is a mirror-less camera that does not lead light to a viewfinder using a half-mirror.

The image sensor 201 includes a plurality of image pickup pixels configured to photoelectrically convert an optical image formed by the image pickup optical system. The image sensor 201 includes a C-MOS sensor and its peripheral circuit, and one photoelectric conversion element is arranged on an area having m light receiving pixels in the lateral direction and n light receiving pixels in the longitudinal direction. Each of all pixels can independently provide an output in the image sensor 201.

Part of pixels of the image sensor 201 is set to focus detecting pixels so as to provide an image-pickup-plane phase-difference AF. A plurality of focus detecting pixels as a whole can receive light that passes an entire area of the exit pupil of the image pickup lens. For example, a couple of diagonal G pixels in two column pixels×two rows pixels are set to the image pickup pixels and the R and B pixels are replaced with focus detecting pixels in the image sensor 201. Alternatively, one pixel may be used for both the focus detecting pixel and image pickup pixel. In this case, all pixels may be used for the focus detecting pixel and image pickup pixel rather than part of the image pickup element 201.

The optical low-pass filter 202 reduces false color and moiré in a captured image.

The driving/control system includes an image sensor controller 203, an image processor 204, a camera controller 205, a display unit 206, a ROM 207, an image-pickup-plane phase-difference focus detector 208, a contrast focus detector 209, operational switches (SW) 210, and a memory 211.

The image sensor controller 203 controls an operation of the image sensor 201, performs an analogue-to-digital conversion to an obtained image signal, and sends the result to the camera controller 205. The image processor 204 performs a γ conversion, a color interpolation, and a JPEG compression for the image obtained by the image sensor 201.

The camera controller 205 is a controller that includes a microcomputer or a CPU, and performs all operations and controls relating to the camera body 200. For example, the camera controller 205 calculates the focus detecting precision of the image-pickup-plane phase-difference AF utilizing the method of JP 2010-139942 or another known method. As described later, the camera controller 205 calculates a wobbling amount in the TV-AF. Moreover, the camera controller 205 calculates an image magnification variation.

The camera controller 205 requests the lens controller 107 to obtain a lens position or to drive a lens by a predetermined driving amount via the contacts 100b and 200b, and obtains lens information peculiar to the interchangeable lens 100 recorded in the ROM 106. The camera controller 205 includes a ROM 207 configured to store a program used to control the camera operation and camera information, a RAM (not illustrated) configured to store variables, and an EEPROM (not illustrated) configured to store a variety of parameters.

The display unit 206 includes an LCD, etc., and serves as a display configured to display information relating to an image pickup mode of a camera, a preview image of pre-capturing and a confirmation image of post-capturing, and an in-focus state image in the focus detection. The display unit 206 is compatible with a live view mode that sequentially displays an image in taking a still image. Moreover, the display unit 206 can display a motion image that is being captured.

The camera information recorded in the ROM 207 contain information used to precisely calculate the precision of the image-pickup-plane phase-difference AF, such as an image pickup screen size of the image sensor 201 (a length, width, and diagonal size of the image sensor 201), the number of pixels, a pixel size, and a diameter of a permissible circle of confusion of an image pickup screen. Moreover, the camera controller 205 executes focus detecting processing illustrated in FIG. 2 utilizing a program stored in the ROM 207.

The image-pickup-plane phase-difference focus detector (first focus detector) 208 obtains a phase difference (shift amount) between a pair of images formed by the focus detecting pixels by a light flux that passes a pair of pupil areas of the image pickup optical system 101, and provides the image-pickup-plane phase-difference AF based upon the phase difference. As a result, the image-pickup-plane phase-difference focus detector 208 can quickly detect an in-focus position. A principle of the image-pickup-plane phase-difference AF is similar to the description and FIGS. 5-7 and 16 in JP 2009-3122. The image-pickup-plane phase-difference focus detector 208 may be integrated with the camera controller 205.

The TV-AF focus detector (second focus detector) 209 provides the TV-AF utilizing a signal value (evaluation value) of a high frequency component obtained by the camera controller 205 from the image processor 204, and precisely detects an in-focus position that maximizes the evaluation value. The TV-AF focus detector 209 may be integrated with the camera controller 205.

The operational SW 210 includes a power switch, a release (image pickup trigger) switch, an image pickup mode selecting switch, an ISO sensitivity setting switch, etc. The image pickup mode selecting switch can selects a still image pickup mode for still image pickup, and a motion image pickup mode used for motion image pickup. The memory 211 is a detachable flash memory, and stores captured images.

Figure 2:
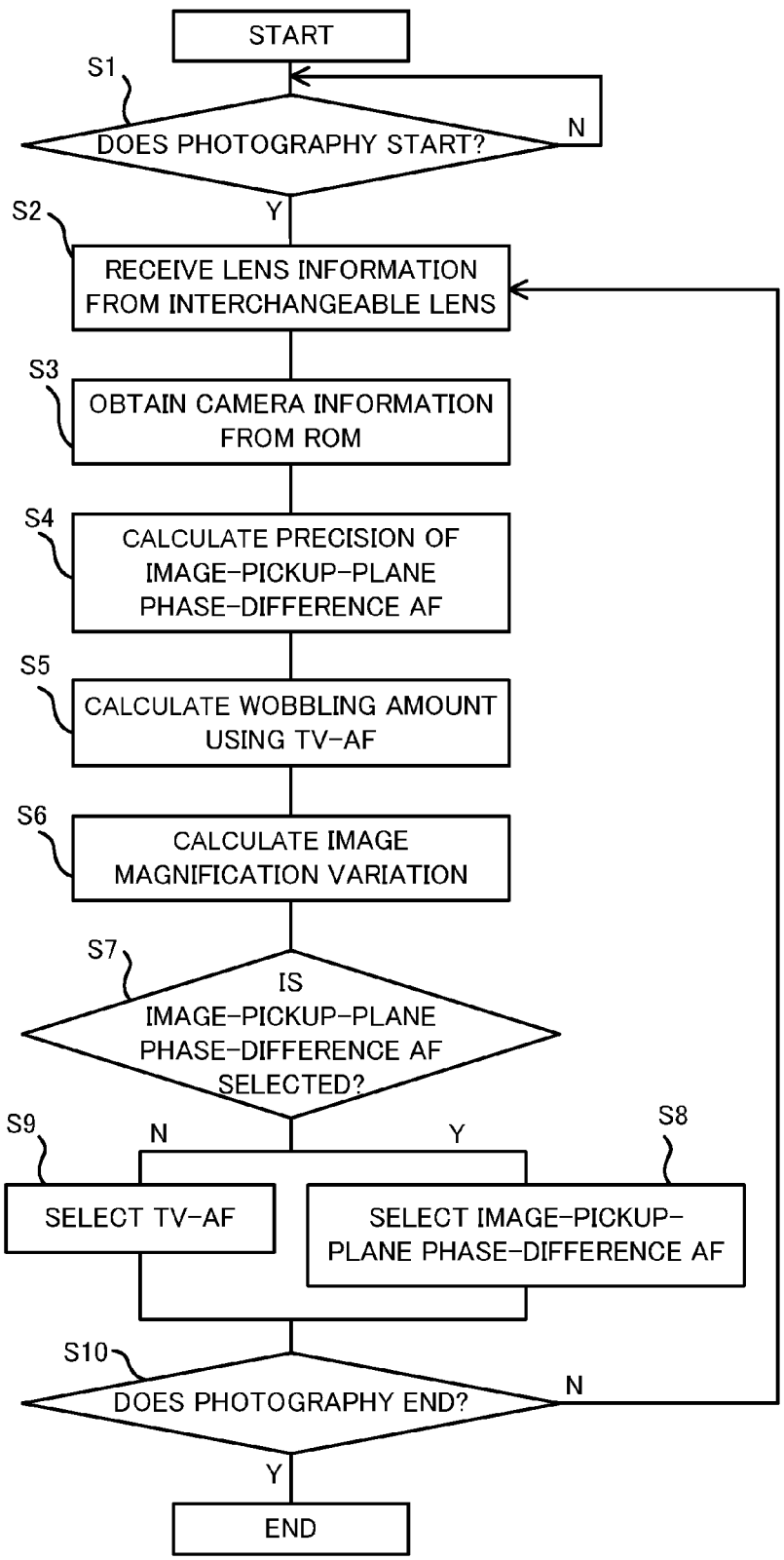
FIG. 2 is a flowchart of determining a focus detecting method.

Referring now to FIG. 2, a description will be given of focus detecting performed by the camera controller 205. In FIG. 2, "S" stands for the step.

FIG. 2 is a flowchart for explaining a focus detecting procedure executed by the camera controller 205, and stored in the ROM 207. The flowchart illustrated in FIG. 2 can be implemented as a program that enables a computer to execute a function of each step.

The photography is started by the user's operation of the operational SW 210, and the focus detecting procedure starts in the live view or the motion image pickup (S1). An effect of this embodiment is maintained even when an image is displayed on an electronic viewfinder attached integrally or as a separate unit to the camera body 200. While the camera of this embodiment is a mirror-less camera, the effect of the invention can be obtained even in a single-lens reflex camera configured to lead a light flux to a viewfinder via a half-mirror in a mirror-up state in the live view or motion image pickup.

Next, the camera controller 205 requests the lens controller 107 to send lens information to the camera controller 205 and receives lens information from the lens controller 107 (S2). Herein, the "lens information" contains a focal length, a focus position (object distance), a diaphragm diameter, image magnification data, and a driving resolution of the focus lens. The image magnification data is an image magnification variation amount when the focus lens 101a is driven by a predetermined amount, and this amount varies according to the focal length and the focus position. Thus, this amount is data for each of the focal length and the focus position.

The camera controller 205 obtains camera information recorded in the ROM 207 (S3), and the focus detecting precision (referred to as "A" hereinafter) of the image-pickup-plane phase-difference AF utilizing the obtained camera information and Expression (2) disclosed in JP2010-139942 (S4).

The camera controller 205 calculates a wobbling amount (referred to as "B" hereinafter) in the TV-AF based upon the diaphragm state, focal length, and driving resolution of the focus lens stored in the lens information (S5). For example, the F-number is calculated based upon the aperture diameter and focal length of the diaphragm 105, and the depth of focus C is given as follows where δ is a diameter of the permissible circle of confusion:

$$\text{Depth of focus } C = 1/4 \times \delta \times F\text{-number} \quad (1)$$

Accordingly, the camera controller 205 determines the wobbling amount B based upon the result calculated with the expression (1). The wobbling amount B is integer times as high as the driving resolution of the focus lens 101a. It is ideal that human eyes do not notice defocus but the TV-AF is available or the focus lens 101a wobbles by an amount less than the depth of focus C so as to detect the in-focus detection. However, it may be necessary to make the wobbling amount B larger than the depth of focus C depending upon the driving resolution of the focus lens 101a and the detection limit of the contrast of the camera.

Next, the camera controller 205 calculates an image magnification variation amount (referred to as "D" hereinafter) when the focus lens 101a is moved by a predetermined amount based upon the focal length, the focus position, and the image magnification data obtained in S2. The camera controller 205 calculates an image magnification variation amount (referred to as "E" hereinafter) based upon the above calculation result and the wobbling amount B determined in S5 (S6). The image magnification variation amount E is given as E=B×D.

The image magnification variation amount D when the focus lens 101a is driven by a predetermined amount is an amount changed by the image pickup optical system 101, and previously calculated as image magnification data illustrated in Table 1, and recorded in the ROM 106. All of "×11" etc. in Table 1 are image magnification variation amounts D when the focus lens 101a is driven by a predetermined amount.

TABLE 1

| | | Image magnification data | | | | |
|---|---|---|---|---|---|---|
| | | Focus position | | | | |
| | | a1 | a2 | a3 | ... | am |
| Focal length | b1 | x11 | x12 | x13 | | x1m |
| | b2 | x21 | x22 | x23 | | x2m |
| | b3 | x31 | x32 | x33 | | x3m |
| | . | | | | | |
| | . | | | | | |
| | bn | xn1 | xn2 | xn3 | | xnm |

Next, the camera controller 205 selects one of the image-pickup-plane phase-difference AF and the TB-AF based upon the focus detection precision A of the image-pickup-plane phase-difference AF calculated in S4, the image magnification variation amount E of the TV-AF calculated in S6, and the AF selection data stored in the ROM 207 (S7).

The AF selection data is, for example, configured to uniquely determine one of the focus detectors based upon the matrix data of the focus detecting precision in the image-pickup-plane phase-difference AF and the image magnification amount in the TV-AF. The camera controller 205 provides the AF utilizing the selected AF method (S8 or S9), and captures an image (S10).

For example, in an example, the camera controller 205 selects one of the image-pickup-plane phase-difference AF and the TB-AF based upon the matrix data illustrated in the following Table 2 (S7). Herein, a first value is used as a threshold for the focus detection precision A of the phase difference AF, and a second value is used as a threshold for the image magnification variation amount E of the TV-AF. Alternatively, a plurality of thresholds may be used for each of them. Instead of the table, a graph may be used which has an ordinate axis of the focus detection precision A of the image-pickup-plane phase-difference AF and an abscissa axis of the image magnification variation amount E of the TV-AF.

TABLE 2

|  | Image magnification variation amount E is second value higher | Image magnification variation amount E is less than second value |
|---|---|---|
| Focus detection precision A of image-pickup-plane phase-difference AF is first value or higher | image-pickup-plane phase-difference AF | image-pickup-plane phase-difference AF |
| Focus detection precision A of image-pickup-plane phase-difference AF is less than first value | TV-AF (for still image pickup) or image-pickup-plane phase-difference AF (for motion image pickup) | TV-AF |

According to the matrix data illustrated in Table 2, the image-pickup-plane phase-difference AF is set when the focus detection precision of the image-pickup-plane phase-difference AF is the first value or higher and the image magnification variation amount is the second value or higher so as to prevent a live view image or a motion image from being degrading (S8). On the other hand, according to the matrix data, the TV-AF is set when the focus detection precision of the image-pickup-plane phase-difference AF is less than the first value and the image magnification variation amount is less than the second value so as to prevent the in-focus precision from lowering (S9).

When the focus detection precision of the image-pickup-plane phase-difference AF is less than the first value and the image magnification variation amount is the second value or higher, which of the image-pickup-plane phase-difference AF or the TV-AF is to be selected may depend upon the image pickup mode of the camera or settings of the camera.

For example, when the image pickup mode of the camera is a still image pickup using the live view, the in-focus precision may be stressed and the TV-AF may be selected whereas the image-pickup-plane phase-difference AF may be selected in the motion image pickup. Even in the motion image pickup, the TV-AF may be selected so as to take preference of the in-focus precision or the image-pickup-plane phase-difference AF may be selected for a larger wobbling amount. Thus, which focus detecting method is to be selected may be previously set by the camera. This is similar when the precision of the image-pickup-plane phase-difference AF is the first value or higher and when the image magnification variation amount is less than the second value. In other words, while Table 2 selects the image-pickup-plane phase-difference AF in an example, TV-AF may be selected.

This embodiment can provide an optical apparatus that can properly select a focus detecting method among the image pickup plane phase difference AF and the TV-AF.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-020662, filed Feb. 2, 2012, which is hereby incorporated by reference herein in its entirety.

What is claimed is:

1. An optical apparatus operable in a still image pickup mode and a motion image pickup mode, the optical apparatus comprising:
   an image sensor configured to detect a pair of image signals, and configured to photoelectrically convert an optical image formed by an optical system;
   a first focus detector configured to provide a focus detection based upon a phase difference between the pair of image signals detected by the image sensor;
   a second focus detector configured to provide a focus detection based upon a contrast of the optical image formed by the optical system; and
   a controller configured to perform a focusing operation in the motion image pickup mode by using the first focus detector when an image magnification variation amount by a wobbling of the optical system used for the second focus detector is equal to or higher than a threshold and by using the second focus detector when the image magnification variation amount is less than the threshold.

2. The optical apparatus according to claim 1, wherein the controller is configured to select the first focus detector or the second focus detector, further based on a focus detection precision of the first focus detector and the image magnification variation.

3. The optical apparatus according to claim 1, wherein the controller is configured to select the first focus detector or the second focus detector, further based on the image magnification variation and an image pickup mode of the optical apparatus.

4. The optical apparatus according to claim 1, wherein the optical apparatus is a camera body to which an interchangeable lens including the optical system is detachably attached.

5. The optical apparatus according to claim 1, wherein the optical apparatus includes an interchangeable lens including the optical system, and a camera body to which the interchangeable lens is detachably attachable.

6. A method for providing autofocus utilizing an optical apparatus operable in a still image pickup mode and a motion image pickup mode and comprising an image sensor, the method comprising:
   detecting, using the image sensor, a pair of image signals;
   photoelectrically converting, using the image sensor, an optical image formed by an optical system;
   providing, using a first focus detector, a focus detection based upon a phase difference between the pair of image signals detected by the image sensor;
   providing, using a second focus detector, a focus detection based upon a contrast of the optical image formed by the optical system;
   performing, using a controller, a focus operation in the motion image pickup mode by using the first focus detector when an image magnification variation amount by a wobbling of the optical system used for the second focus detector is equal to or higher than a threshold and by using the second focus detector when the image magnification variation amount is less than the threshold.

7. The method according to claim 6, further comprising selecting, using the controller, the first focus detector or the second focus detector, further based on a focus detection precision of the first focus detector and the image magnification variation.

8. The method according to claim 6, further comprising selecting, using the controller, the first focus detector or the second focus detector, further based on the image magnification variation and an image pickup mode of the optical apparatus.

* * * * *